United States Patent
Jo

(10) Patent No.: US 12,509,016 B1
(45) Date of Patent: Dec. 30, 2025

(54) SIDE AIRBAG ASSEMBLY

(71) Applicant: HYUNDAI MOBIS CO., LTD., Seoul (KR)

(72) Inventor: Kum Ho Jo, Yongin-Si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 19/241,163

(22) Filed: Jun. 17, 2025

(30) Foreign Application Priority Data

Dec. 6, 2024 (KR) ........................ 10-2024-0180399

(51) Int. Cl.
*B60R 21/2338* (2011.01)
*B60R 21/207* (2006.01)
*B60R 21/231* (2011.01)
*B60R 21/16* (2006.01)

(52) U.S. Cl.
CPC ........ *B60R 21/2338* (2013.01); *B60R 21/207* (2013.01); *B60R 21/23138* (2013.01); *B60R 2021/161* (2013.01); *B60R 2021/23146* (2013.01); *B60R 2021/23386* (2013.01)

(58) Field of Classification Search
CPC .............. B60R 21/2338; B60R 21/207; B60R 21/23138; B60R 2021/161; B60R 2021/23146; B60R 2021/23386
See application file for complete search history.

(56) References Cited

U.S. PATENT DOCUMENTS

| | | | | |
|---|---|---|---|---|
| 6,736,426 | B2* | 5/2004 | Winters | B60R 21/276 280/743.2 |
| 7,222,877 | B2* | 5/2007 | Wipasuramonton | B60R 21/2338 280/730.2 |
| 7,506,892 | B2* | 3/2009 | Klinkenberger | B60R 21/2338 280/743.2 |
| 7,922,197 | B2* | 4/2011 | Fukawatase | B60R 21/233 280/739 |
| 8,684,408 | B2* | 4/2014 | Thomas | B60R 21/2338 280/730.2 |
| 9,428,135 | B1* | 8/2016 | Thomas | B60R 21/231 |
| 9,457,759 | B2* | 10/2016 | Sugimoto | B60R 21/233 |
| 11,377,062 | B2* | 7/2022 | Kwon | B60R 21/231 |
| 11,807,166 | B2* | 11/2023 | Deng | B60R 21/2338 |
| 12,179,689 | B1* | 12/2024 | Kim | B60R 21/2338 |
| 12,263,803 | B2* | 4/2025 | Cho | B60R 21/2338 |

FOREIGN PATENT DOCUMENTS

| | | | | | |
|---|---|---|---|---|---|
| CN | 105857241 | A | * | 8/2016 | ............ B60R 21/23 |
| DE | 102012216896 | A1 | * | 3/2013 | ............ B60R 21/231 |
| KR | 20180128948 | A | * | 12/2018 | ....... B60R 21/23138 |
| KR | 20220046338 | A | * | 4/2022 | ....... B60R 21/23138 |

* cited by examiner

*Primary Examiner* — Faye M Fleming
(74) *Attorney, Agent, or Firm* — NovoTechIP International PLLC

(57) ABSTRACT

The present invention relates to an improved side airbag assembly capable of preventing free movement of a tether during deployment of an airbag. The side airbag assembly includes an airbag built into a seat of a vehicle and deployed outward from the seat, a tether disposed on an outer surface of the airbag and configured to control free movement of the airbag when the airbag is deployed, and a guide patch disposed on the outer surface of the airbag and coupled to the tether, and the guide patch allows the tether to pass therethrough at least twice.

10 Claims, 4 Drawing Sheets

SIDE AIRBAG ASSEMBLY

CROSS-REFERENCE TO RELATED APPLICATIONS

This application claims priority to and the benefit of Korean Patent Application No. 10-2024-0180399, filed on Dec. 6, 2024, the disclosure of which is incorporated herein by reference in its entirety.

TECHNICAL FIELD

The present invention relates to a side airbag assembly.

BACKGROUND

A side airbag assembly for use in vehicles may inflate and deploy an airbag forward from a side of a seat to protect the side of a driver or occupant, extending from the chest to the hip, from a door structure of a vehicle. The side airbag assembly may include an airbag built into the seat and deploying from the inside of the seat by penetrating the seat and a tether coupled to the airbag and guiding the shape of the airbag to implement a bent shape of the airbag during the deployment of the airbag. Here, the airbag may be coupled to an inflator to be inflated by a gas generated from the inflator.

Among them, the tether is disposed on an outer surface of the airbag and is disposed to surround the airbag. Accordingly, the tether may guide the shape of the airbag while being moved along the inflating airbag. However, since side airbag assemblies in the related art lack a separate means for securing the tether, the tether may move freely when the airbag inflates. Thereby, the difficulty of implementing the bending shape of the airbag increases, and thus a phenomenon in which the airbag does not bend toward the side of the body of the occupant may occur. In addition, the free movement of the tether may cause a problem in which the inflating airbag is not disposed at a location corresponding to the side of the body of the occupant or is deployed toward a rear side of a seatback.

Therefore, the need for a structure capable of preventing the free movement of the tether when the airbag is deployed is increasing.

SUMMARY

The present invention is directed to providing an improved side airbag assembly capable of preventing free movement of a tether when an airbag is deployed.

According to an aspect of the present invention, there is provided a side airbag assembly including an airbag built into a seat of a vehicle and deployed outward from the seat, a tether disposed on an outer surface of the airbag and configured to control free movement of the airbag when the airbag is deployed and a guide patch disposed on the outer surface of the airbag and coupled to the tether, in which the guide patch allows the tether to pass therethrough at least twice.

The guide patch may include a first slit and a second slit that allow the tether to enter and exit and the first slit and the second slit may be disposed in a direction perpendicular to a direction in which the tether is disposed.

The guide patch may include a main body on which the first slit and the second slit are disposed and a fixing portion that fixes the main body to the airbag, and the first slit and the second slit may be disposed inside the fixing portion.

The tether may be movable inside the fixing portion in a state of having passed through the first slit and the second slit of the guide patch.

The airbag may include a first panel having an outer surface as a contact surface and a second panel having an outer surface as a non-contact surface, and the tether may include a first region disposed on the first panel, a second region bent once from an end of the first region and disposed on the second panel, and a third region bent once from an end of the second region disposed on the second panel and disposed on the first panel.

The guide patch may include a first patch that guides a disposition direction of the first region of the tether, a second patch that guides a disposition direction of the second region of the tether, and a third patch that guides a disposition direction of the third region of the tether.

The first patch and the third patch of the guide patch may be disposed on the outer surface of the first panel, and the second patch of the guide patch may be disposed on the outer surface of the second panel.

In addition, according to another aspect of the present invention, there is provided a side airbag assembly including an airbag built into a seat of a vehicle and including a first panel having an outer surface as a contact surface and a second panel having an outer surface as a non-contact surface, a tether disposed on an outer surface of the airbag and configured to control free movement of the airbag when the airbag is deployed, and a guide patch disposed on the outer surface of the airbag and configured to guide a direction in which the tether is disposed, in which at least one guide patch is disposed on each of the first panel and the second panel.

The guide patch may include a first slit and a second slit that allow the tether to enter and exit and the first slit and the second slit may be disposed in a direction perpendicular to a direction in which the tether is disposed.

The guide patch may include a main body on which the first slit and the second slit are formed and a fixing portion that fixes the main body to the airbag, and the first slit and the second slit may be disposed inside the fixing portion.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

Figure 1:
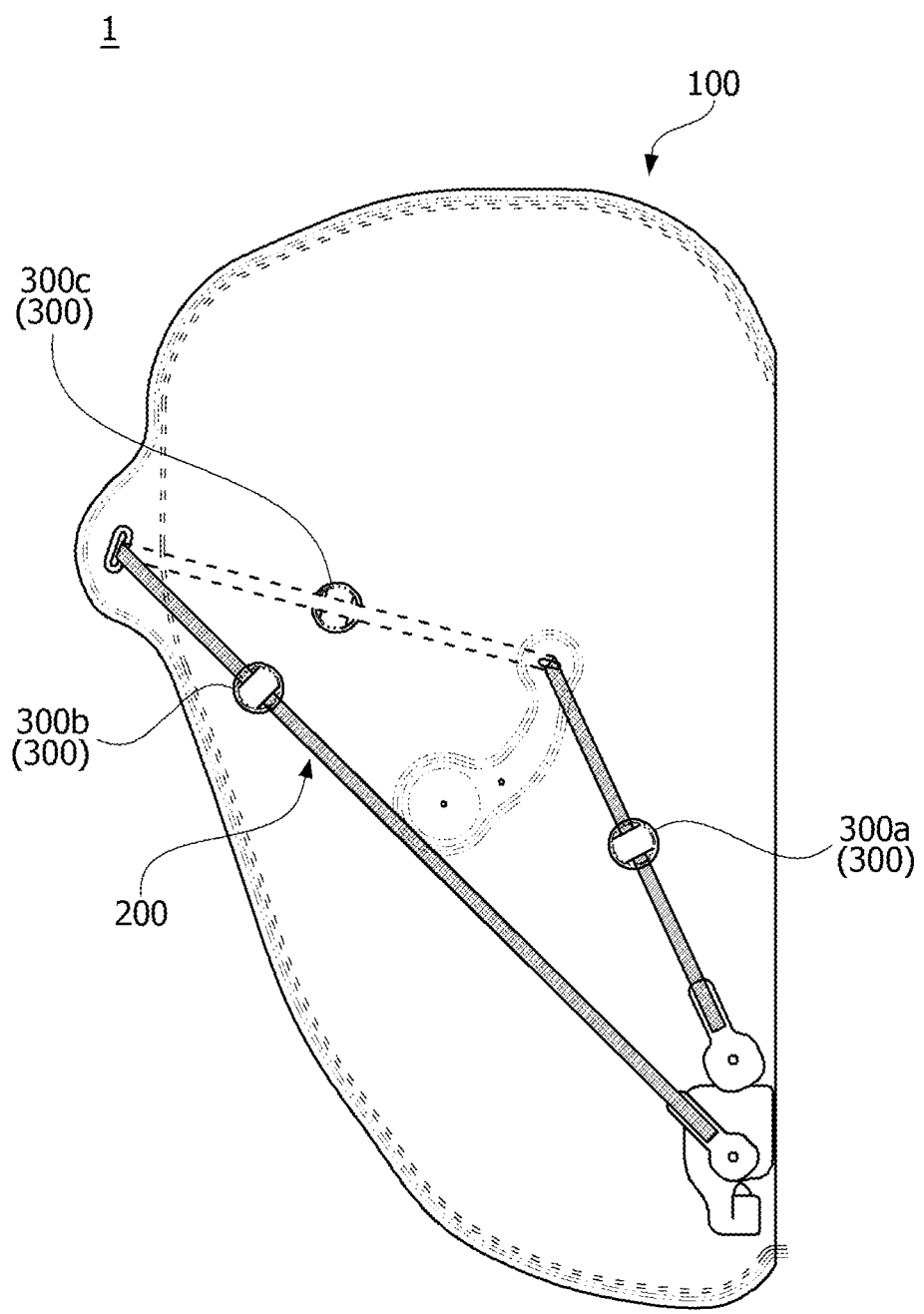
FIG. 1 is a view showing a side airbag assembly according to one embodiment of the present invention.

Since the present invention may be variously modified and embodied, particular embodiments thereof will be illustrated in the drawings and described. However, this is not intended to limit the present invention to the specific embodiments, and it should be understood to include all modifications, equivalents, and substitutes included in the spirit and scope of the present invention.

Although the terms including ordinal numbers such as first, second, or the like, may be used to describe various elements, these elements are not limited by these terms. These terms are only used to distinguish one element from another element. For example, without departing from the scope of the present invention, a second element could be termed a first element, and similarly, a first element could be termed a second element. The term "and/or" includes a combination of a plurality of related listed items or any of a plurality of related listed items.

It will be understood that when an element is referred to as being "coupled" or "connected" to another element, the element may be directly coupled or connected to the other element, or intervening elements may also be present. In contrast, it will be understood that when an element is referred to as being "directly coupled" or "directly connected" to another element, there are not intervening elements present.

In the description of embodiments, when one element is described as being formed "on" or "under" another element, "on" or "under" includes both a case in which the two elements are directly in contact with each other and a case in which at least one additional element is formed to be disposed between the two elements (indirectly). Further, when expressed as "on or under", the expression may include the meaning of not only an upward direction but also a downward direction based on one element.

The terms used in the present application are merely provided to describe specific embodiments, and are not intended to limit the present invention. The singular forms are intended to include the plural forms as well, unless the context clearly indicates otherwise. In the present application, it will be understood that terms "include," "have," or the like are intended to specify the presence of features, integers, steps, operations, elements, components, and/or combinations thereof stated in the specification, but do not preclude the possibility of the presence or addition of one or more other features, integers, steps, operations, elements, components, or combinations thereof in advance.

Unless otherwise defined, all terms used herein, including technical or scientific terms, have the same meaning as commonly understood by those of ordinary skill in the art to which the present invention belongs. Terms, such as those defined in commonly used dictionaries, should be interpreted as having a meaning that is consistent with their meaning in the context of the related art and will not be interpreted in an idealized or overly formal sense unless expressly so defined herein.

Hereinafter, a side airbag assembly will be described in detail with reference to the accompanying drawings, but identical or corresponding components are denoted by the same reference numerals regardless of figure numbers, and redundant descriptions thereof will be omitted.

FIG. 1 is a view showing a side airbag assembly according to one embodiment of the present invention.

Referring to FIG. 1, a side airbag assembly 1 according to one embodiment of the present invention may protect an occupant sitting in a seat of a vehicle from a vehicle collision accident. Such a side airbag assembly 1 may include an airbag 100, a tether 200, and a guide patch 300.

Figure 2:
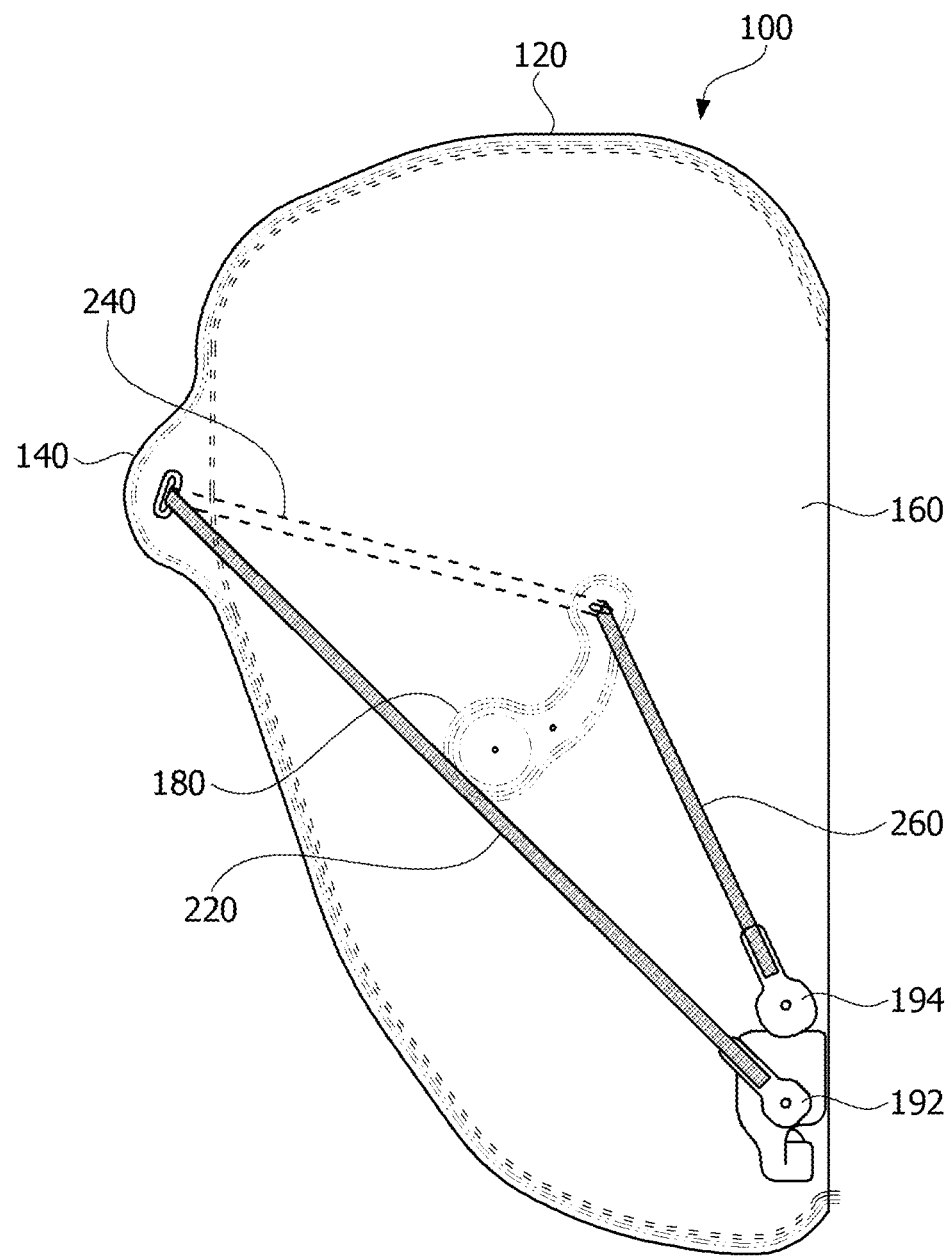
FIG. 2 is a view showing a state in which a tether is disposed on an airbag.

FIG. 2 is a view showing a state in which a tether is disposed on an airbag.

Referring to FIGS. 1 and 2, the airbag 100 is built into a seat (not shown) of the vehicle and may be deployed outward from the seat. The airbag 100 may include a main body 120 and a protrusion 140.

The main body 120 (hereinafter referred to as a "first main body 120") may form the exterior of the airbag 100. The first main body 120 may have a shape formed by coupling two panels, a first panel 100a and a second panel 100b, which have mutually symmetrical shapes (see FIG. 4). Here, the first panel 100a may include a contact surface having an outer surface that comes into contact with the body of the occupant, and the second panel 100b may include a non-contact surface having an outer surface that does not come into contact with the body of the occupant.

The first main body 120 may have a shape in which the first panel 100a and the second panel 100b are fixed to each other by sewing while being in contact with each other such that their edges are joined to each other. Accordingly, an active portion 160 in which gas discharged from an inflator (not shown) is accommodated may be formed inside the first main body 120.

The protrusion 140 may be disposed near the edge of the first main body 120. The protrusion 140 may have a shape that protrudes toward the outside of the first main body 120 near the edge of the first main body 120. The protrusion 140 may be disposed on a path through which the tether 200 passes. A hole through which the tether 200 may pass may be formed in the protrusion 140. This protrusion 140 may be a portion that does not inflate because the entrance of gas moving from the first main body 120 is blocked.

In addition, an inactive portion 180 may be formed on an inner side of the active portion 160, which is an inner side of a sewn region of the first main body 120. Such an inactive portion 180 may guide a movement direction of the gas moving inside the active portion 160 and serve to assist in forming a region of the first main body 120 that comes into contact with the body of the occupant. In addition, a hole through which a tether 200 may pass may be formed in the inactive portion 180.

In addition, the airbag 100 may include a first fixing portion 192 and a second fixing portion 194. The first fixing portion 192 and the second fixing portion 194 may be coupled to one end and the other end of the tether 200 disposed on an outer surface of the airbag 100 to fix the tether 200 to the airbag 100.

Referring again to FIGS. 1 and 2, the tether 200 may be disposed on the outer surface of the airbag 100, and may control free movement of the airbag 100 during the deployment of the airbag 100. The tether 200 may have one end fixed to an outer surface of the first panel 100a of the airbag 100, and may penetrate the airbag 100 at least twice in a state in which the one end is fixed to the outer surface of the first panel 100a of the airbag 100, so that the other end may be fixed to the outer surface of the first panel 100a again.

More specifically, the tether 200 may pass through the hole formed in the protrusion 140 of the airbag 100 along the outer surface of the first panel 100a of the airbag 100 in the state in which one end of the tether is fixed to the first fixing portion 192 of the airbag 100, and then, may be disposed on an outer surface of the second panel 100b of the airbag 100. In addition, the tether 200 may pass through the hole formed in the inactive portion 180 of the airbag 100 in the state of being disposed on the outer surface of the second panel 100b of the airbag 100 and then re-disposed on the outer surface of the first panel 100a of the airbag 100. The tether 200 re-disposed on the outer surface of the first panel 100a of the airbag 100 may reach a fully disposed state on the airbag 100 by fixing its other end to the second fixing portion 194 of the airbag 100.

Here, the tether 200 may include a first region 220 disposed between the first fixing portion 192 of the first panel 100a of the airbag 100 and the protrusion 140 of the airbag 100, a second region 240 disposed on the second panel 100b by being bent once from an end of the first region 220, and a third region 260 disposed on the first panel 100a by being bent once from an end of the second region 240 disposed on the second panel 100b.

Here, the third region 260 may be disposed between the hole formed in the inactive portion 180 of the airbag 100 and the second fixing portion 194 of the airbag 100. In this way, the tether 200 disposed to surround the outer surface of the airbag 100 may guide a disposition position of the airbag 100 and a bent shape of the airbag 100 during inflation of the airbag 100, thereby allowing the airbag 100 to be accurately disposed at a position corresponding to the side of the body of the occupant.

Figure 3:
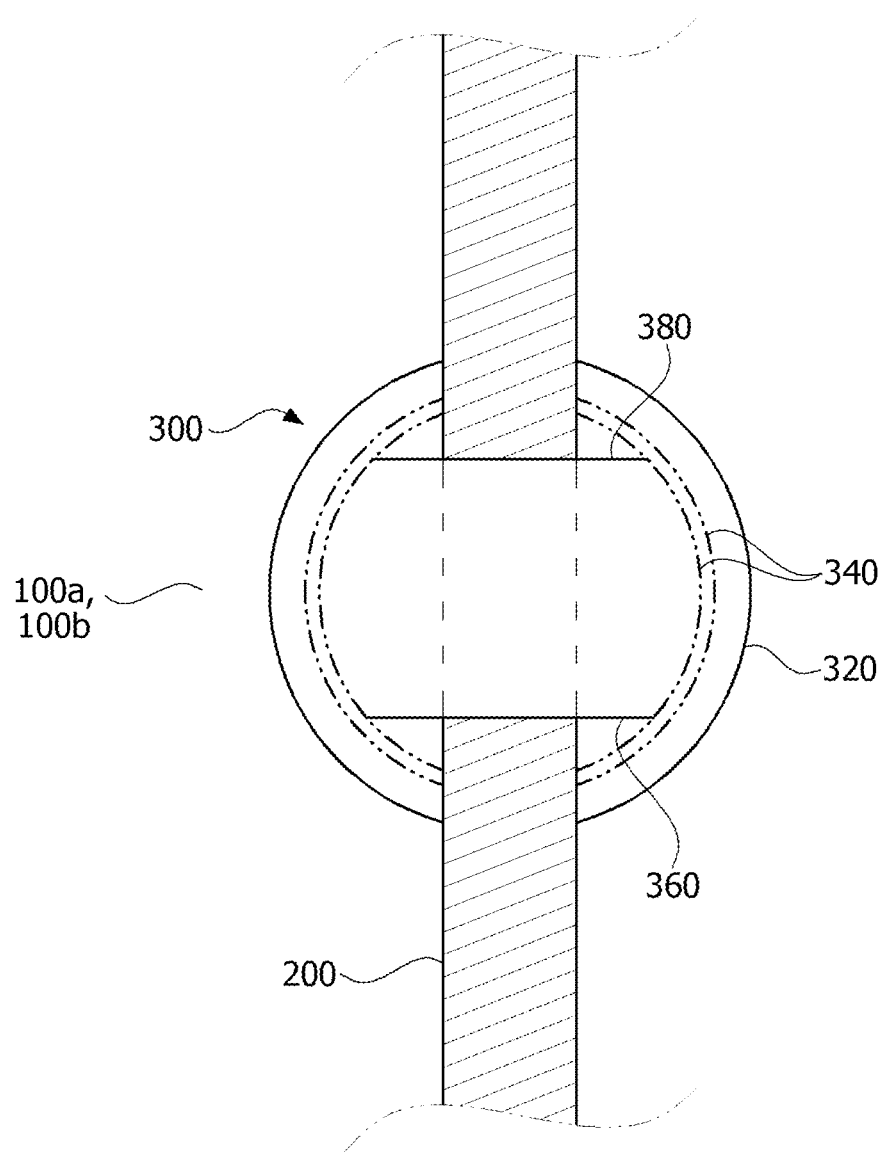
FIG. 3 is an enlarged view showing a state in which the tether is coupled to a guide patch.
Figure 4:
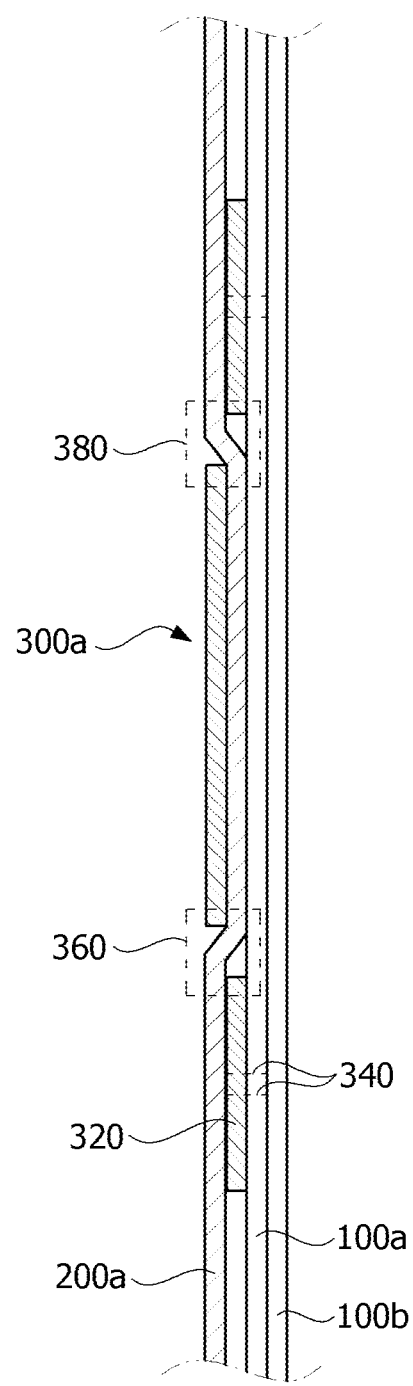
FIG. 4 is a cross-sectional view showing the state in which the tether is coupled to the guide patch.

FIG. 3 is an enlarged view showing a state in which the tether is coupled to the guide patch, and FIG. 4 is a cross-sectional view showing the state in which the tether is coupled to the guide patch.

Referring to FIGS. 1, 3, and 4, the guide patch 300 may be disposed on the outer surface of the airbag 100 and coupled to the tether 200. The guide patch 300 may include a main body 320, a fixing portion 340, a first slit 360, and a second slit 380. Here, for convenience, FIG. 4 shows a first patch 300a of the guide patch 300 disposed on the first panel 100a of the airbag 100.

The main body 320 (hereinafter referred to as a "second main body 320") may have a configuration in which the first slit 360 and the second slit 380 are disposed. As shown in FIGS. 1 and 3, the second main body 320 may be provided in a circular shape, but is not limited thereto.

The fixing portion 340 (hereinafter referred to as a "third fixing portion 340") may fix the second main body 320 to the airbag 100. This second fixing portion 194 may be formed by sewing. The third fixing portion 340 may be formed on an inner side of an edge of the second main body 320 and disposed on each of the outer surfaces of the first panel 100a and the second panel 100b of the airbag 100. That is, the third fixing portion 340 may be a component disposed together with the second main body 320. The third fixing portion 340 may have a circular shape. Here, an inner side of the third fixing portion 340 of the second main body 320 may form a space for accommodating the tether 200 together with the outer surface of the first panel 100a or the outer surface of the second panel 100b of the airbag 100.

The first slit 360 and the second slit 380 may allow the tether 200 to enter and exit. Here, based on FIG. 3, the first slit 360 may be disposed at a lower portion of the third main body, and the second slit 380 may be disposed at an upper portion of the third main body and an upper portion of the first slit 360. In addition, the first slit 360 may serve as an entrance through which the tether 200 is introduced into the guide patch 300, and the second slit 380 may serve as an exit through which the tether 200 introduced into the interior of the guide patch 300 is discharged. In addition, the first slit 360 and the second slit 380 may be disposed in a direction perpendicular to the direction in which the tether 200 is disposed.

The first slit 360 and the second slit 380 may be disposed inside the third fixing portion 340 formed in the second main body 320 of the guide patch 300. A disposed structure of the first slit 360 and the second slit 380 may prevent the first slit 360 and the second slit 380 from being damaged, such as being torn by the tether 200. Accordingly, the free movement of the tether 200 coupled to the guide patch 300 is reduced, so that the stability of deployment of the airbag 100 may be maintained.

By the first slit 360 and the second slit 380 described above, the tether 200 may be movable inside the fixing portion in a state of having passed through the first slit 360 and the second slit 380. This may restrict the range of free movement of the tether 200, thereby allowing a structure for reducing the movement or shaking of the tether 200 to be provided. Accordingly, the problem that the shape in which the airbag 100 deployed by the movement of the tether 200 is bent toward the occupant during the deployment of the airbag 100 is not implemented may be prevented in advance. In addition, since the free movement of the tether 200 is reduced by the first slit 360 and the second slit 380, an effect in which the deployed airbag 100 may be stably disposed at a position corresponding to the side of the occupant may be provided. Accordingly, the occupant impact absorption performance of the airbag 100 may be maintained.

The guide patch 300 may include the first patch 300a that guides a disposition direction of the first region 220 of the tether 200, a second patch 300b that guides a disposition direction of the second region 240 of the tether 200, and a third patch 300c that guides a disposition direction of the third region 260 of the tether 200. Here, the first patch 300a and the third patch 300c may be disposed on the outer surface of the first panel 100a, and the second patch 300b may be disposed on the outer surface of the second panel 100b. That is, the guide patch 300 guides the disposition direction of the tether 200 surrounding the airbag 100 to prevent separation of the tether 200 and ensure the stability of the tether 200, thereby improving the stability of deployment of the airbag 100.

As described above, the side airbag assembly 1 according to one embodiment of the present invention may have a structure in which the guide patch 300 allows the tether 200 to pass therethrough at least twice. Accordingly, the stability of deployment of the airbag 100 may be ensured and the shifting of the airbag 100 may be prevented, thereby preventing additional injuries to occupants caused by the airbag 100.

According to one embodiment of the present invention, since a guide patch is disposed on an outer surface of an airbag so that a tether is movably accommodated therein, it is possible to reduce free movement of the tether. Accordingly, the deployment stability of the airbag can be improved, and the deployment position of a deployed airbag can be stably formed.

In addition, since the free movement of the tether is reduced by the guide patch, a bending shape of the airbag by the tether can be stably implemented. Accordingly, the time at which the airbag is in contact with occupant can be implemented as intended in a manufacturing process.

Although the embodiments of the present invention have been described above, it is understood that one ordinary skilled in the art may make various changes and modifications to the present invention without departing from the spirit and scope of the present invention as hereinafter claimed. Further, it should be construed that differences associated with such changes and modifications fall within the scope of the present invention defined by the accompanying claims.

What is claimed is:

1. A side airbag assembly comprising:
   an airbag built into a seat of a vehicle and configured to be deployed outward from the seat;
   a tether disposed on an outer surface of the airbag and configured to control free movement of the airbag when the airbag is deployed; and a guide patch disposed on the outer surface of the airbag and coupled to the tether,
wherein the guide patch is configured to allow the tether to pass through the guide patch at least twice.

2. The side airbag assembly of claim 1, wherein:
the guide patch includes a first slit and a second slit that allow the tether to enter and exit, and
the first slit and the second slit are disposed in a first direction perpendicular to a second direction in which the tether is disposed.

3. The side airbag assembly of claim 2, wherein the guide patch includes:
a main body having the first slit and the second slit; and
a fixing portion configured to fix the main body to the airbag,
wherein the first slit and the second slit are disposed inside the fixing portion.

4. The side airbag assembly of claim 3, wherein the tether is movable inside the fixing portion in a state of having passed through the first slit and the second slit of the guide patch.

5. The side airbag assembly of claim 1, wherein:
the airbag includes a first panel having an outer surface as a contact surface and a second panel having an outer surface as a non-contact surface, and
the tether includes:
a first region disposed on the first panel;
a second region bent once from an end of the first region and disposed on the second panel; and
a third region bent once from an end of the second region and disposed on the first panel.

6. The side airbag assembly of claim 5, wherein the guide patch includes:
a first patch configured to guide a disposition direction of the first region of the tether;
a second patch configured to guide a disposition direction of the second region of the tether; and
a third patch configured to guide a disposition direction of the third region of the tether.

7. The side airbag assembly of claim 6, wherein the first patch and the third patch of the guide patch are disposed on the outer surface of the first panel, and the second patch of the guide patch is disposed on the outer surface of the second panel.

8. A side airbag assembly comprising:
an airbag built into a seat of a vehicle and including a first panel having an outer surface as a contact surface and a second panel having an outer surface as a non-contact surface;
a tether disposed on an outer surface of the airbag and configured to control free movement of the airbag when the airbag is deployed; and
a guide patch disposed on the outer surface of the airbag and configured to guide a direction in which the tether is disposed,
wherein at least one guide patch is disposed on each of the first panel and the second panel.

9. The side airbag assembly of claim 8, wherein:
the guide patch includes a first slit and a second slit that allow the tether to enter and exit, and
the first slit and the second slit are disposed in a first direction perpendicular to a second direction in which the tether is disposed.

10. The side airbag assembly of claim 9, wherein the guide patch includes:
a main body having the first slit and the second slit; and
a fixing portion configured to fix the main body to the airbag,
wherein the first slit and the second slit are disposed inside the fixing portion.

* * * * *